United States Patent
Breuer et al.

(10) Patent No.: US 12,452,771 B2
(45) Date of Patent: Oct. 21, 2025

(54) METHOD FOR CONTROLLING ACCESS TO A BASE STATION

(71) Applicant: Telit Cinterion Deutschland GmbH, Munich (DE)

(72) Inventors: Volker Breuer, Boetzow (DE); Iavor Antonov, Berlin (DE)

(73) Assignee: Telit Cinterion Deutschland GmbH, Munich (DE)

( * ) Notice: Subject to any disclaimer, the term of this patent is extended or adjusted under 35 U.S.C. 154(b) by 342 days.

(21) Appl. No.: 17/798,943

(22) PCT Filed: Feb. 17, 2021

(86) PCT No.: PCT/EP2021/053888
§ 371 (c)(1),
(2) Date: Aug. 11, 2022

(87) PCT Pub. No.: WO2021/165320
PCT Pub. Date: Aug. 26, 2021

(65) Prior Publication Data
US 2023/0057106 A1    Feb. 23, 2023

(30) Foreign Application Priority Data
Feb. 19, 2020 (EP) .................................. 20305159

(51) Int. Cl.
*H04W 48/10* (2009.01)
*H04W 48/20* (2009.01)

(52) U.S. Cl.
CPC ........... *H04W 48/10* (2013.01); *H04W 48/20* (2013.01)

(58) Field of Classification Search
CPC . H04W 48/10; H04W 48/12; H04W 74/0833; H04W 48/20; H04W 76/27; H04W 48/00; H04W 48/16
See application file for complete search history.

(56) References Cited

U.S. PATENT DOCUMENTS

2014/0064176 A1* 3/2014 Anchan ............... H04W 74/006
                                                                    370/312
2017/0311290 A1* 10/2017 Adjakple .............. H04W 76/18
(Continued)

FOREIGN PATENT DOCUMENTS

EP          3355599 A1     8/2018

OTHER PUBLICATIONS

International Search Report (PCT/ISA/210) and Written Opinion (PCT/ISA/237) mailed on Mar. 25, 2021 by the European Patent Office as the International Searching Authority for International Application No. PCT/EP2021/053888—[17 pages].

(Continued)

*Primary Examiner* — Allahyar Kasraian
(74) *Attorney, Agent, or Firm* — PEARL COHEN ZEDEK LATZER BARATZ LLP (57) ABSTRACT

Provided is a method to operate a base station of a cellular network, the base station being capable of supporting bandwidth limited operation of user equipments camping on said base station, comprising the step for said base station of broadcasting a set of system information items. The set of system information items additionally comprises a first system information item indicating that camping is allowed for at least one first user equipment supporting bandwidth limited operation only. The set of system information items comprise a second system information item indicating whether newly camping is allowed for at least one second user equipments supporting additionally other modes of operation than bandwidth-limited operation, under the condition that said second user equipment is intending to use at least one of the features specific to a base station supporting bandwidth-limited operation. Other embodiments disclosed.

12 Claims, 4 Drawing Sheets

(56) References Cited

U.S. PATENT DOCUMENTS

| | | | | |
|---|---|---|---|---|
| 2018/0139687 A1* | 5/2018 | Breuer | .............. | H04W 28/0215 |
| 2019/0223156 A1* | 7/2019 | Fujishiro | ............... | H04W 76/15 |
| 2020/0100301 A1* | 3/2020 | Kusashima | ........... | H04W 74/06 |
| 2020/0245293 A1* | 7/2020 | Peisa | ..................... | H04W 76/11 |

OTHER PUBLICATIONS

"6 Random access procedure", 3GPP Draft; 36213-F80, 3rd Generation Partnership Project {3GPP), Mobile Competence Centre; 650, Route Des Lucioles; F-06921 Sophia-Antipolis Cedex; France • Dec. 17, 2019 (Dec. 17, 2019), XP051839451, Retrieved from the Internet: URL:https://ftp.3gpp.org/tsg_ran/WGIRLI/D RAFT/ Clean versions/36213-f80.zip—36213-f80 s06-s07.docx [retrieved on Dec. 17, 2019] paragraph [7.1.x].

Thales, R2-2000251, 3GPP, TSG-RAN WG2 Meeting #109e "Clarifiation to idle mode mobility for non-BL UEs", Feb. 13, 2020, pp. 1-2.

3rd Generation Partnership Project; Technical Specification Group Radio Access Network, Evolved Universal Terrestrial Radio Access (E-UTRA); Radio Resource Control (RRC); Protocol specification (Release 15), BGPP Standard: Technical Specification: 3GPP TS 36.331. 3RD Generation Partnership Project (3GPP). Mobile Co. Mpetence Centre 650, Route Des Lucio Les. F-06921 Sophia-Anti Polis Cedex France vol. RAN WG2, No. V15.8.0- Jan. 8, 2020 (Jan. 8, 2020), p. +-964 pp. 1-100.

3rd Generation Partnership Project; Technical Specification Group Radio Access Network; Evolved Universal Terrestrial Radio Access (E-UTRA); Physical channels and modulation (Release 15), 3GPP Standard; Technical SRECIEICATION:3GRRIS.36.211-3RD. GENERATIONRARINERSUR.RROJEGT/3GRR\mMOBILEn Competence Centre; 650, Route Des Lucioles; F-06921 Sophia-Antipolis Cedex; France vol. RAN WGI, No. VI5.8.Jan. 1-15, 2020 (Jan. 15, 2020), pp. 96-188.

3rd Generation Partnership Project; Technical Specification Group Radio Access Network; Evolved Universal Terrestrial Radio Access (E-UTRA); Medium Access Control (MAC) protocol specification (Release 15}, Bgpp Standard: Technical Specification: 3GPP TS 36.321. 3RD Generation Partnership Project 3GPP), Mobile Competence Centre; 650, Route Des Lucioles; F-06921 Sophia-Antipolis Cedex; France vol. RAN WG2, No. VI5.8.0-Jan. 7, 2020 (Jan. 7, 2020}, pp. 1-134.

* cited by examiner

METHOD FOR CONTROLLING ACCESS TO A BASE STATION

CROSS-REFERENCE TO RELATED APPLICATIONS

This application is a National Phase Application of PCT International Application No. PCT/EP2021/053888, International Filing Date Feb. 17, 2021, claiming priority to European Patent Application No. 20305159.4 filed Feb. 19, 2020, which is hereby incorporated by reference.

FIELD OF THE INVENTION

The present invention relates to a method to operate a base station of a cellular network. The invention also pertains to a base station using said method. The invention further relates to a method for a user equipment operating with said base station. It further pertains to a user equipment using said method.

BACKGROUND OF THE INVENTION

Recent developments in the field of wireless cellular communication technologies consider different type of devices operating in a cellular network to assign different categories with different requirements for operating with the respective base stations. This is in particular visible in the defined categories of LTE (Long Term Evolution) which are supposed to be available in the new standard of 5G/NR (New Radio) as well.

Such categories are in particular LTE-Cat NB-IoT and Cat-M and called LPWAN concepts. These are dedicated for user equipments with low processing capabilities and/or tight power consumption requirements. Hence, in such categories only a small fraction of the available bandwidth in a frequency band supported by a base station needs to be used. In the standardization this approach is known under the term "bandwidth-limited" (BL).

Said LPWAN concepts will be adapted to the next generation standard NR/5G and will be also maintained in LTE/4G. As part of the adaptation for 5G for bandwidth-limited communication categories additional adaptions to the protocol stack are defined resp. under preparation, like operating in enhanced coverage, long DRX cycles (eDRX), a deep sleep mode called Power saving Mode (PSM) etc.

With the roll-out of this approach it appears, that a base station may provide such bandwidth-limited support, while other base stations do not provide it. Additionally user equipments being camped on such a bandwidth-limited only base station need to decode said limited bandwidth whilst for normal user equipments the receiving bandwidth could be up to 20 MHz. In particular base stations may be designed that way, that they have a regular part and a bandwidth-limited part, either as shared or separate transceiver/antenna hardware. In most cases this may be shared hardware and only the MAC (medium access control) will do this distinction accordingly.

Hence for a user equipment that is only operating in bandwidth-limited mode, it is necessary to camp on the supporting base station, while it cannot camp on the base station that is not supporting bandwidth-limited operation.

On the other hand, regular user equipments may take advantage of operating in the bandwidth-limited mode as well, in particular when the additional adaptations mentioned above shall be used. E.g. operating on a cell in enhanced coverage mode allows camping on a base station which in normal operation would not be decodable.

Furthermore only to operate with a small fraction of the frequency band, as long as no large data exchange session is due, will also for regular user equipments—like handsets—lead to a positive effect on the power consumption, means on the operation duration with one battery charge cycle. I.e. the user equipment even when not consuming any of the special features from the bandwidth-limited mode will benefit from the limited bandwidth in its decoding required for paging reception or system information. It also may turn off one receiver chain as normal devices run on two receiver chains whilst the bandwidth limited mode, especially Cat-M (NB-IoT) user equipments, as low cost user equipments, are designed to operate with one receiver chain.

This general behavior of regular user equipments is currently not prevented in the technology standardization and obviously renders advantages for the regular user equipments.

However each base station has only a limited capacity for serving user equipments, in particular through the limited number of paging groups and members of a paging group. This can lead to the situation that a bandwidth-limited only user equipment has in its proximity only one available base station supporting bandwidth-limited communication, but this is fully blocked, in particular by user equipments which could operate on other base stations nearby that are not supporting bandwidth-limited communication.

In effect this situation could lead to an out-of-service situation for such bandwidth-limited only user equipments, while for the regular user equipments sufficient capacities on the non-bandwidth-limited base stations would be available. This situation is even more severe having in mind, that such bandwidth-limited user equipments are often stationary installed, like metering devices or the like. That means, there is no possibility to move away from the out-of-service location.

Hence it requires an adaption of the user equipment resp. base station behavior in order to achieve a better allocation of base station capacities and thus to avoid out-of-service situations for bandwidth-limited user equipments.

It is therefore the goal of present invention to overcome the mentioned disadvantages and to propose a solution for an improved control of the user equipments access to base stations.

Further alternative and advantageous solutions would, accordingly, be desirable in the art.

SUMMARY OF THE INVENTION

In a first aspect, the invention is embodied as a method to operate a base station of a cellular network. A second aspect of the invention is embodied as a bases station. A third aspect of the invention is embodied as a method for a user equipment. A fourth aspect of the invention is embodied as a user equipment.

According to the first aspect of the invention it is proposed a method to operate a base station of a cellular network, the base station being capable of supporting bandwidth limited operation of a plurality of user equipments camping on said base station, comprising the step for said base station of broadcasting a set of system information items, wherein the set of system information items additionally comprises a first system information item indicating that camping is allowed for at least one first user equipment supporting bandwidth limited operation only, and the set of system information items comprise a second system information item indicating whether newly camping is allowed for at least one second user equipments supporting additionally other modes of operation than bandwidth-limited operation, under the condition that said second user equipment is intending to use at least one of the features specific to a base station supporting bandwidth-limited operation.

The inventive method is applied to a base station being part of a cellular network implementing the technology standards of 4G, 5G or beyond. The cellular network comprises a plurality of base stations, implementing at least one of these technology standards. The cellular network further comprises further network component communicatively linked to the base stations.

The base station is the counterpart on the air interface to the user equipments and configured to transmit and receive on certain frequency ranges.

The method applies to a base station which is capable of supporting bandwidth-limited operation. This is a mode of operation which only employs a subset of the available bandwidth of the base station. It is in particular advantageous for user equipments with lower processing power to operate in bandwidth-limited (BL) mode. For some user equipments it is even the only mode they are capable of operating with the base station.

As an advantage bandwidth limited user equipments have a receiver/processing capability being adapted to its requirement i.e. for Cat-M. A Cat-M1 user equipment only needs to receive 6 PRBs (physical resource blocks) as bandwidth limited operation corresponds to a spectrum allocation of 1.4 MHz and when being deployed inband the actual occupied bandwidths refers to 1.08 MHz, i.e. 6×180 kHz considering the nominal subcarrier spacing of 15 kHz as used in LTE. In addition the resource assignment is not for the same reception frame in the downlink (DL), as assignment and data part may be on different PRBs, and hence the DL assignment is for the next but one frame as it may otherwise conflict with the bandwidth limited reception capability. I.e. as assignment and data part don't need to be in the same PRBs, whilst regular user equipments always can receive LTE in up to 20 MHz, i.e. the maximum carrier bandwidth and accordingly data and assignment is in the same frame.

As regular user equipments are also capable of operating in bandwidth-limited mode, it can happen, that the capacity of the base station for serving bandwidth-limited only user equipments falls short. Here comes the invention into play to avoid resp. cope with that situation.

According to the inventive method it is proposed that the base station, which is capable of supporting bandwidth-limited operation mode, submit system information comprising a first system information item indicating that camping is allowed only for user equipments supporting bandwidth limited operation only.

It is known that base stations broadcast system information in a set of so-called system information blocks (SIBs), which comprise a plurality of information items. Each user equipment which intends to camp on said base station, is obliged to receive, decode and to follow the received information items. Preferably different sets of system information blocks are available for separate type of user equipments, in particular for bandwidth limited devices, machine type devices etc.

With this new system information item it is indicated to the receiving user equipments, that a user equipment which intends to camp anew on this base station needs to be capable of operating in bandwidth-limited operation only.

That means, if regular user equipment which is also capable of operating in normal bandwidth mode, would want to camp on the base station, the access is blocked. This is a kind of selective barring for normal bandwidth user equipments.

Additionally it is proposed that the broadcasted system information further comprise a second system information item. This second system information item has the task to indicate whether a newly camping user equipment is allowed which supports other modes of operation than bandwidth-limited operation. However such camping contrary to the first system information item is only allowed under the condition that such second user equipment is intending to use at least one of the features specific to base stations supporting bandwidth-limited operation.

This condition affects user equipments that—though they are capable of operating in normal bandwidth—intend to operate in bandwidth-limited mode not only to save resources, but due to a purpose. This purpose is a specific feature for base stations supporting bandwidth-limited operation.

In particular such features specific to the base station supporting bandwidth-limited operation comprises at least one out of the group of:
enhanced coverage mode,
enhanced discontinuous reception mode,
power saving mode,
periodic data transmission (D-PUR),
early data transmission or reception (EDT).

Enhanced coverage mode is a mode for user equipments deployed in bad coverage conditions. By repeating transmissions the receiving user equipment is capable of cumulating the received signals until they are decodable. This is capable of increasing the coverage by up to 10 dB.

Enhanced discontinuous reception mode (eDRX) is an enhanced variation of the discontinuous reception for bandwidth-limited user equipments, as it allows larger DRX cycle durations, which allows power saving.

The power-saving mode (PSM) is a mode which allows the user equipment to activate a deep sleep for a defined time, and to wake up after that time without the need to register again at the base station. This massively reduces power consumption, for the price, that the user equipment cannot receive pagings during the sleep time.

The periodic data transmission, in particular the so called D-PUR (dedicated preconfigured uplink resources), is a mode where the user equipment negotiates with the base station that in certain cycles a defined amount of data is transmitted, which is typical for metering devices. So at each occasion no new resource allocation is needed to be requested which reduces the amount of data exchange per data transmission, and consequently saves time and power.

Early data transmission or reception (EDT) is a mechanism to optimize the support for infrequent small data packet transmissions, which was introduced for NB-IoT and LTE-Cat M. With that mechanism a data transmission is carried out during the random access procedure. This mechanism improves the battery life of the user equipment and reduces the message latency.

One or a combination of the mentioned or additionally introduced features for bandwidth-limited user equipments are sufficient to be eligible to camp on a base station with the respective value broadcasted in the first and second system information item.

In effect with these two new system information items a fine-grained approach is available which allows the base station to manage its bandwidth-limited capacity in a more elaborated approach than a simple all-or-nothing approach.

In case the base station runs short of BL capacity it can activate the first and second system information items and thus keep away additional regular user equipments which do not need to be operating in BL.

According to a preferred embodiment it is proposed that the set of system information items further comprises at least one system information item indicating if a neighbor base station is supporting bandwidth-limited operation. With this additional system information item the user equipments that camp on the base station or are planning to camp on it get information if neighbor base stations are a valuable target in the sense, that an operation in bandwidth-limited mode is possible or not.

This system information item is in particular helpful for both, the BL-only user equipments and regular user equipment which want to use BL operation. Preferably such system information item is transmitted along those system information blocks indicating neighbor base stations.

Such system information would in particular mitigate the situation addressed by this invention independent of the transmission of the first and second system information item.

According to another preferred embodiment it is proposed that the second system information item is further accompanied by a third system information item indicating whether already camping user equipments supporting other modes of operation than bandwidth-limited operation are allowed to stay on said base station.

This embodiment is meant to be an addition to the inventive method which is in the first place designated to keep away newly camping user equipments planning to operate in BL mode.

If that is not sufficient the already camping regular user equipments are preferably sent away. For such case it is in particular helpful to employ said proposed third system information item. This system information item has the effect to discontinue the operation of user equipment which do not need to operate in bandwidth-limited mode, in order to free resources for those user equipments which have no means to operate in other modes than bandwidth-limited mode, like a normal mode.

This embodiment is advantageous as it allows an additional step for the base station of making available its capacity for the user equipment which are bound to operate in BL mode. It has a more intense impact on the user equipments that are already camping on the base station, as it could lead to an out of service situation for such BL only user equipment.

To mitigate that drawback further measures are foreseen. Hence according to another preferred embodiment it is suggested that the second system information item further indicates that at least one user equipment supporting at least one other mode than bandwidth-limited mode is alternatively allowed to camp on said base station under the condition that it has no opportunity to camp on another base station in normal mode conditions.

With this embodiment another condition is introduced which allows a user equipment which could operate in a mode different from bandwidth-limited mode to stay on the base station, although the capacities of the base station are limited, which is indicated through the first and/or second system information item.

This is the case when no opportunity is available around for camping in normal mode. For that preferably the user equipment figures out for the evaluated neighbor cells, whether for operating in normal mode none fulfills the suitability criteria for camping on the neighbor base station.

Based on this evaluation the user equipment may decide according to this embodiment that it is in spite of the capacity issue of the base station, and that the second system information item indicates that such user equipments may not camp, eligible to camp on the base station. With this embodiment such special situations are covered as part of exceptional case handling. The drawback for the base station should be low, as this situation might only apply to a small share of user equipments and base stations.

In another preferred embodiment it is proposed that the set of system information item further comprises a fourth system information item indicating for which group or category of user equipments at least one of the group of first or second system information items is valid.

With this embodiment it is proposed to introduce another system information item, which indicates the group resp. category of user equipments affected by the first and second system information item.

The group or category in particular distinguished MTC resp. IoT devices from handhelds, as well.

Alternatively or additionally the group resp. category is derived from the network slice where the user equipment is assigned to. Here e.g. an automotive slice vs. a metering slice etc. could be distinguished.

Alternatively or additionally the type of subscription is taken into account for said distinction of groups. E.g. a data only subscription might have other requirements than a fully voice capable device like a handset or an entertainment unit of a car.

In general also a combination of more than one of the mentioned features could be the basis for groups or categories as meant by this embodiment of the invention.

With the indication at least one of the groups or categories are selected in order to control access for such user equipments. This gives the base station more the possibility to fine-tune the access without affecting too many user equipments, which might not be the reason for the capacity bottleneck. According to another preferred embodiment it is proposed the method further comprising the step for the base station of placing at least two of said users equipment supporting another mode of operation than the bandwidth-limited mode and allowed to camp on said base station in the same paging group or a respective wakeup-signal group.

This embodiment relates to another means for the base station to control the behavior of the user equipments. With the paging groups the base station puts together camping user equipments which listen at the same time to pagings.

When e.g. an incoming call for one of the members of the paging group is in the queue, than each member of the paging group needs to check this paging in order to figure out if it applies to the user equipment or not.

Such paging groups have in the first place nothing in common with the groups as mentioned before.

By placing user equipments operating in bandwidth-limited, in particular those that are only capable of operating in bandwidth limited mode, in the same paging group than such user equipments which are capable of operating in another mode than the bandwidth limited mode, this has a positive effect on the power consumption. Due to many normal users being frequently paged bandwidth-limited user equipment being in the same paging group would be subsequentially woken up and hence have an increased power consumption behavior.

Hence this embodiment contributes additionally another power saving effect to the invention.

According to the second aspect of the invention it is proposed a base station of a cellular network, the base station being capable of supporting bandwidth limited operation of a plurality of user equipments camping on said base station, wherein the base station is configured to broadcast a set of system information items, wherein the set of system information items additionally comprises a first system information item indicating that camping is allowed for at least one first user equipment supporting bandwidth limited operation only, and the set of system information items comprise a second system information item indicating whether newly camping is allowed for at least one second user equipments supporting additionally other modes of operation than bandwidth-limited operation, under the condition that said second user equipment is intending to use at least one of the features specific to a base station supporting bandwidth-limited operation.

The base station is part of a cellular network implementing at least the technology standard of 4G, 5G or beyond. The base station is called in the respective technology standard eNodeB resp. gNodeB.

The base station is equipped with transmitting and receiving circuitry as well as at least one antenna for communication via air interface with a plurality of user equipments. It is further equipped with communication means for direct or indirect communication with other cellular network components, in particular core network and other base stations. It further comprises processing circuitry for controlling at least all communication related tasks.

The base station is capable of supporting bandwidth limited operation. Preferably it may equipped with circuitry for supporting bandwidth limited operation and normal operation.

The base station regularly broadcasts system information in a plurality of system information blocks. These system information blocks preferably comprise each a plurality of system information items. The system information blocks are at least once broadcasted during one broadcast channel modification period, during which no change in the system information is happening.

The second aspect of the invention shares the advantages of the first aspect of the invention.

According to the third aspect of the invention it is proposed a method for a user equipment configured for operation with a base station being capable of supporting bandwidth limited operation, comprising the steps of:
  receiving a set of system information items from at least one of said base stations,
  in the case that one of said system information items indicates that camping is allowed for the user equipment supporting bandwidth limited operation only,
  when the user equipment is capable of operating with a base station in other than bandwidth limited operation, and using at least one of the features specific to a base station supporting in bandwidth-limited operation,
  continuing operating with the base station,
  otherwise conducting a reselection to a base station supporting other than bandwidth limited operation.

This aspect of the invention relates to a user equipment capable of operating with a base station according to the second aspect of the invention.

The user equipment is in a situation where it wants to camp on said base station—we call it target base station hereinafter—which is capable of supporting bandwidth-limited mode. For a user equipment which is also capable of supporting bandwidth-limited mode, it would be advantageous to use that mode, even in case normal mode would be possible.

The user equipment is either just—e.g. after switching on—in course of registering in the cellular network of the base station, or is camping on another base station of the cellular network nearby. In the latter case a cell-reselection is intended by the user equipment, in particular when the suitability criteria of the target base station are sufficient compared to the currently serving base station.

For doing so, the user equipment needs to synchronize with the target base station via the synchronization channels ((P)SCH). Afterwards the user equipment decodes the broadcast channels (BCCH), in particular the system information blocks.

Part of the system information blocks are at least a first and as second system information item indicating if camping is allowed only for user equipments supporting bandwidth-limited operation.

The user equipment evaluates in response to reception of such system information items its capabilities and intended use.

When it is a user equipment which is only capable of operating in bandwidth-limited mode, like a NB-IoT user equipment, then it will in any case camp on said base station, alternatively continue operating with said base station, if it already camps on it.

When it is a user equipment which is capable of other modes than the bandwidth-limited mode, then it needs to be evaluated if a feature specific to bandwidth-limited operation, like enhanced coverage, D-PUR or the like, is about to be used.

Only if that is the case the user equipment may camp on that base station. If not another base station needs to be searched by way of reselection.

If the user equipment is already camping on the base station in a preferred embodiment the user equipment would need to reselect to another base station in normal mode.

Should the base station also be capable of supporting normal mode, then to switch to that normal mode would also be sufficient.

In a further advantageous embodiment it is proposed for the user equipment the steps of evaluating availability of suitable neighbor base station, comprising maintaining a list of candidate neighbor base stations, and evaluating at least one of the candidate neighbor base stations,
  wherein the step of evaluating comprising the steps of
    receiving a set of system information items from the neighbor base station,
    in the case the set of system information items from the neighbor base station comprises an indication that camping is allowed for user equipments supporting bandwidth limited operation only,
  removing said neighbor base station from the list of candidate neighbor base stations.

This embodiment improves for a user equipment that is supposed to operate in bandwidth-limited mode the efforts for selecting a base station for camping. Therefore it is proposed to maintain a list of candidate neighbor base stations. This is preferably happening after powering up, in particular for the first time, and receiving the signals, in particular the broadcast, from all available base stations around.

It is then figured out which of the base stations are capable of supporting bandwidth-limited operation mode, and which are capable of supporting only bandwidth-limited operation.

When the user equipment is capable of supporting other modes than the bandwidth-limited mode, such a user equipment can—at least for the time being—be removed from the list of candidate neighbor base stations.

This list may be maintained, or regularly updated on occasion of a necessary or at least envisaged cell-change. As the system information items may change over time, in particular with the change of usage, after certain time the base station may be considered as neighbor base station again, when sufficient capacity for operating in bandwidth-limited mode is available.

According to the fourth aspect of the invention it is proposed a user equipment configured for operation with a base station being capable of supporting bandwidth limited operation, wherein the user equipment is configured to support bandwidth-limited operation, to receive a set of system information items from at least one of said base stations, in the case that one of said system information items indicates that camping is allowed for user equipment supporting bandwidth limited operation only, when the user equipment is capable of operating with a base station in other than bandwidth limited operation, and using at least one of the features specific to a base station supporting in bandwidth-limited operation, to continue operating with the base station, otherwise to conduct a reselection to a base station supporting other than bandwidth limited operation.

This aspect of the invention relates to a user equipment for operating in a cellular network. It is implementing at least one of the technology standard 4G, 5G or beyond.

The user equipment in particular comprises transmitting circuitry and receiving circuitry, in particular implemented as a transceiver circuitry. The user equipment further comprises an antenna and processing circuitry for controlling operation of the user equipment, in particular protocol stack software for controlling the transceiver and assuring that the protocol as defined in the technology standard protocol is followed. In particular the user equipment has a controlling unit, comprising said processing circuitry and other components, like user interface, sensors etc., and a communication unit, comprising the transmitting and receiving circuitry.

Additionally the user equipment preferably comprises volatile and/or permanent memory for storing the software, as well as configuration data, like received system information and other parameter for assuring data transmission procedures.

It in particular comprises of a communication unit, like a wireless module, that performs all communication with the serving base station of the cellular network, and an application part, which controls the communication unit, and/or the user interface and other tasks of the user equipment.

The fourth aspect shares the advantages of the third aspect of the invention.

As it is shown this invention advantageously solves the depicted problem and offers a solution where reliable means for fine-grained control of camping user equipments in bandwidth-limited mode through the base station is offered. With that it can be assured that user equipments that are only capable of operating in bandwidth-limited mode should find a supporting base station with sufficient capacity to serve the user equipment.

BRIEF DESCRIPTION OF THE DRAWINGS

The following description and the annexed drawings set forth in detail certain illustrative aspects and are indicative of but a few of the various ways in which the principles of the embodiments may be employed. Characteristics and advantages of the present invention will appear when reading the following description and annexed drawings of advantageous embodiments given as illustrative but not restrictive examples.

Figure 1:
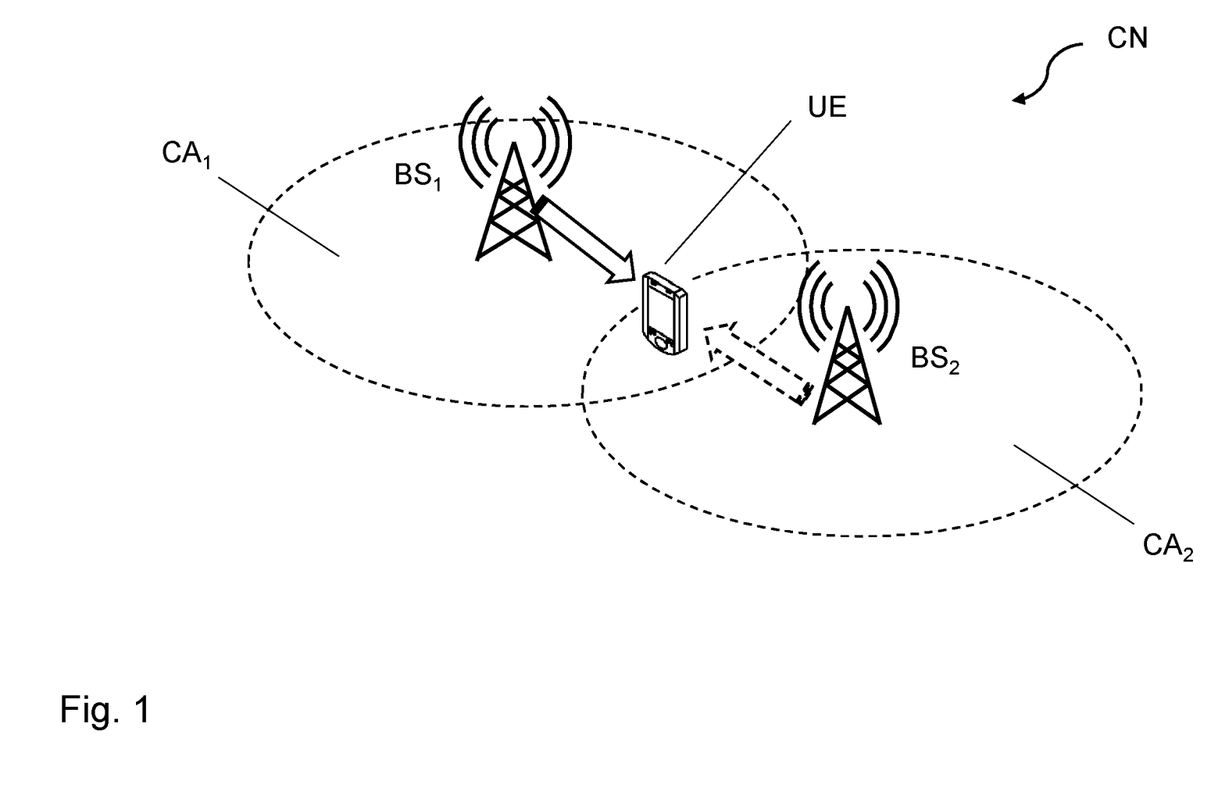
FIG. 1 shows a user equipment in conjunction with a base station of the type to which the present invention is applied as an embodiment.

FIG. 1 schematically shows the situation of a user equipment UE camping on a first base station $BS_1$ of a cellular network CN. The user equipment UE is located in the cell area $CA_1$ of the first base station $BS_1$ and in the cell area $CA_2$ at least of one second base station $BS_2$.

The first base station $BS_1$ is a base station that is only supporting bandwidth-limited operation. This is a so-called "standalone cell".

The user equipment UE however is capable of operating both in bandwidth-limited mode, and in normal mode, that is any other mode than bandwidth-limited mode.

Due to a couple of advantages e.g. in terms of power consumption the user equipment chose to camp on the first base station $BS_1$ and to operate in bandwidth-limited mode, as this is the only supported mode there.

However, it can happen that the capacities for supplying user equipments run short at the first base station $BS_1$. This is in particular disadvantageous for user equipments that are only capable of operating in bandwidth-limited mode, like NB-IoT devices, moreover when those are operating stationary.

In that case the first base station $BS_1$ would send in its system information blocks a couple of system information items which indicate that a user equipment that is capable of operating not only in bandwidth-limited mode shall not camp on the base station, as long as it does not need to.

Figure 2:
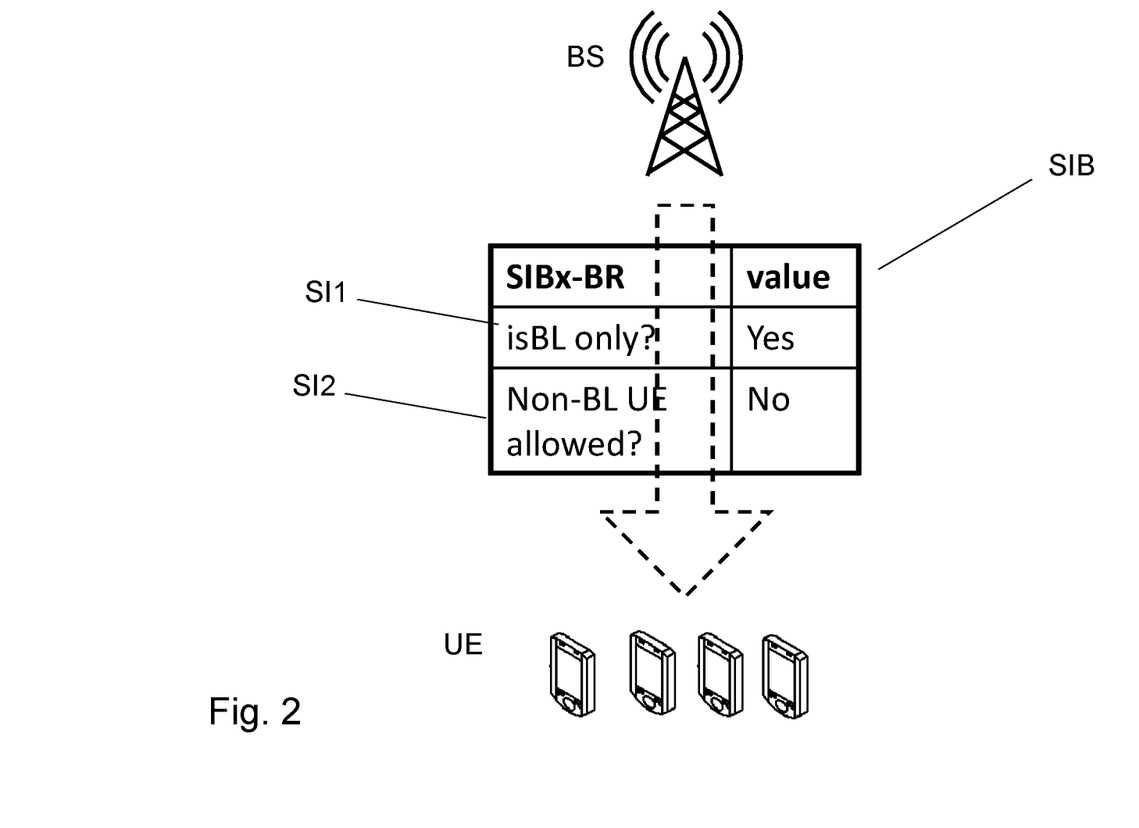
FIG. 2 display system information data transmission from a base station to a user equipment according to an exemplifying embodiment of the invention.

This is shown in FIG. 2 where the base station BS broadcasts its system information blocks SIB to the user equipments UE located in the cell area. The user equipments are expected to read and decode the broadcast should they want to camp on the base station.

In this exemplifying embodiment the system information blocks SIB comprise two system information items SI1 and SI2 as part of the SIBx-BR, which is in particular designated for bandwidth-limited (also named bandwidth-reduced) user equipments.

The first system information item SI1 indicates that generally camping on the base station BS is only allowed when the user equipment is a BL only user equipment. When detecting this, a user equipment which is not only a BL user equipment needs to check the second system information item SI2.

This second system information item SI2 indicates whether user equipments that are not only operating in bandwidth-limited mode are allowed only when certain conditions are met. If this is not indicated by said second system information item SI2, no of such user equipment is allowed to access—this is the strongest setting for securing access for BL-only user equipments.

If the value is set to Yes, then the user equipment that is also able to operate in other modes than the bandwidth-limited mode may camp on the base station BS under the condition, that it uses features specific to a base station supporting in bandwidth-limited, like eDRX, PSM or the like.

Additionally the base station may indicate information relating to neighbour base stations.

That is shown in FIG. 1, where the base station $BS_1$ according to an exemplifying embodiment also broadcasts an indication relating to at least a neighbour base station $BS_2$, if this is a BL only base station, or a full-bandwidth, and potentially supporting bandwidth-limited operation as well.

The user equipment UE then may chose upon reception of the respective system information items, to carry out a cell reselection and to continue operation, if possible also in bandwidth-limited mode, on the neighbour base station $BS_2$.

This shows that the standalone base station can through submission of such system information relief itself from user equipments that not need to camp on it, resp. to avoid that additional user equipments camp on it.

Figure 3:
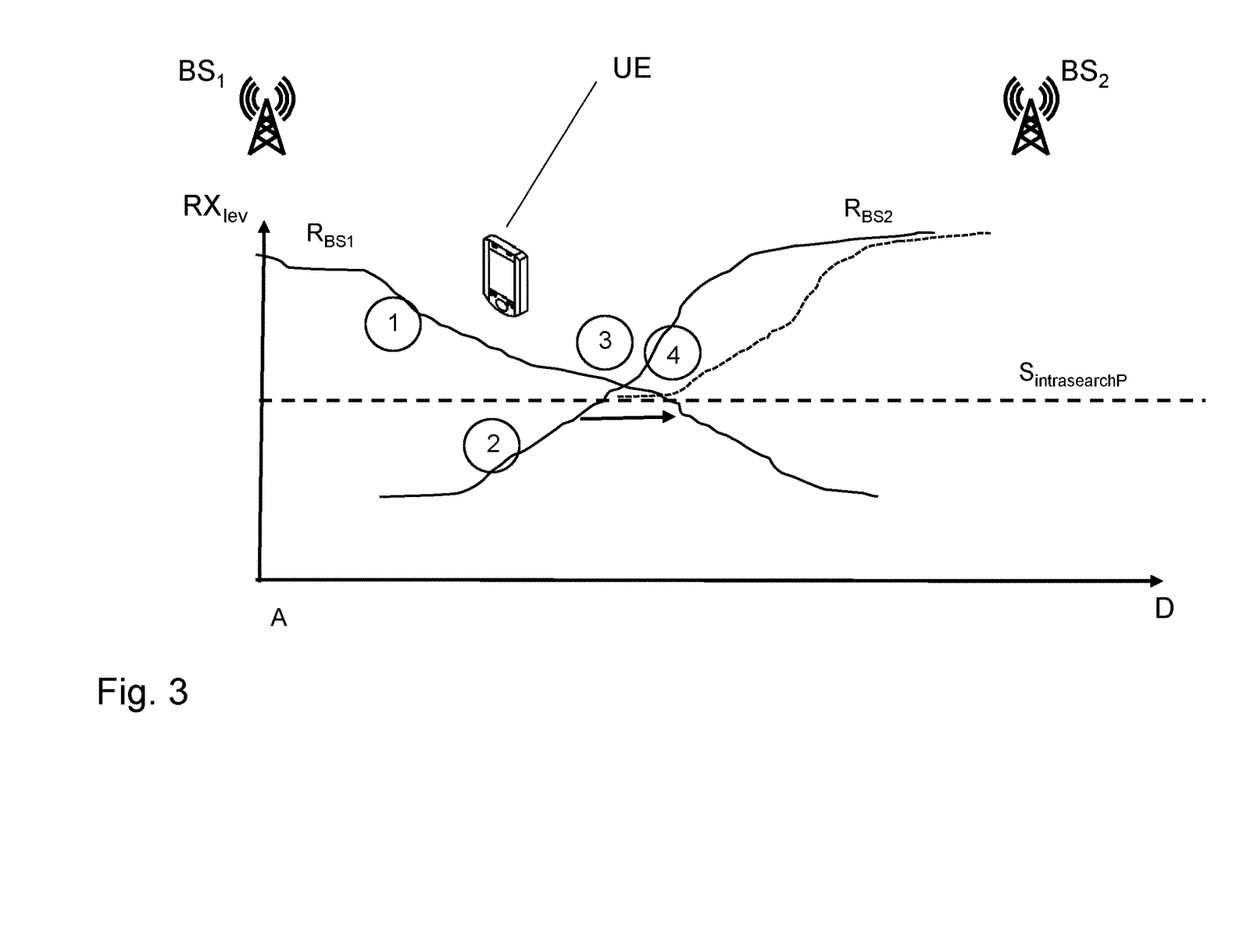
FIG. 3 shows a first exemplifying diagram of reception level change for a user equipment moving between two base stations.

In FIG. 3 it is shown for a moving user equipment UE the change of reception level $R_{BS1}$ and $R_{BS2}$ from two base stations, wherein the user equipment is first camping on the first base station $BS_1$, and consequently reselect to the second base station $BS_2$.

When moving from location A to location D the following situation happens on the respective numbers:

1) The UE is aware that the neighbor base station $BS_2$ supports BL-operation and normal mode operation due to information from the SIBs of the previous serving base station $BS_1$. For camping on $BS_2$ the received power is far too low (below $S_{intrasearchP}$), and lower than the reception level from the first base station $BS_1$.

2) The UE starts receiving the BL part of the second base station $BS_2$ only by means of coverage enhancement (CE) methods, but the reception level of the second base station is still below the serving cell.

3) The reception level of the neighbor base station $BS_2$ becomes for coverage enhancement (CE) mode larger than that of the reception level of the serving cell. The UE which intends to remain on BL-mode operation reads the SIB1-BR of the second base station $BS_2$. As an example here SIB1-BR indicates that it is not allowed to camp, as long CE mode is not needed.

4) Also the reception level in non-CE mode is higher than that of the serving base station. A normal UE supporting BL-mode could switch to $BS_2$, but needs to operate in normal operation after reading SIB1-BR. However, as the reception level of $BS_1$ (and all other base stations around), the user equipment could operate also in BL mode on base station $BS_2$, even though the SIB1-BR indicates that it is not allowed, due to the fact that no other suitable cell is available.

The reselection was delayed from 3 to 4 to avoid selecting BL-part, acquiring SIB1-BR start reading detect barring for desired mode of operation, afterwards acquire SIB1-BR and start acquiring all non-BL SIBs again of said base station. Delay is rather due to the non-BL part barring if the base station $BS_2$ would have been open for normal UEs supporting BL mode, also to camp in BL mode UE would have done so. Means the UE intends to camp on the BL part of the base station even though it could also camp on the normal (non-BL) part. As a consequence it first needs to read the related SIBs for BL-operation, i.e. starting from SIB1-BR and all further SIBs indicated. Once having detected the barring in SIB1-BR it switches the operation mode to full 20 MHz operation (non-BL) and starts by reading SIB1 and in addition all SIBs which are required for camping on said cell. Afterwards registration/camping procedure is executed.

Figure 4:
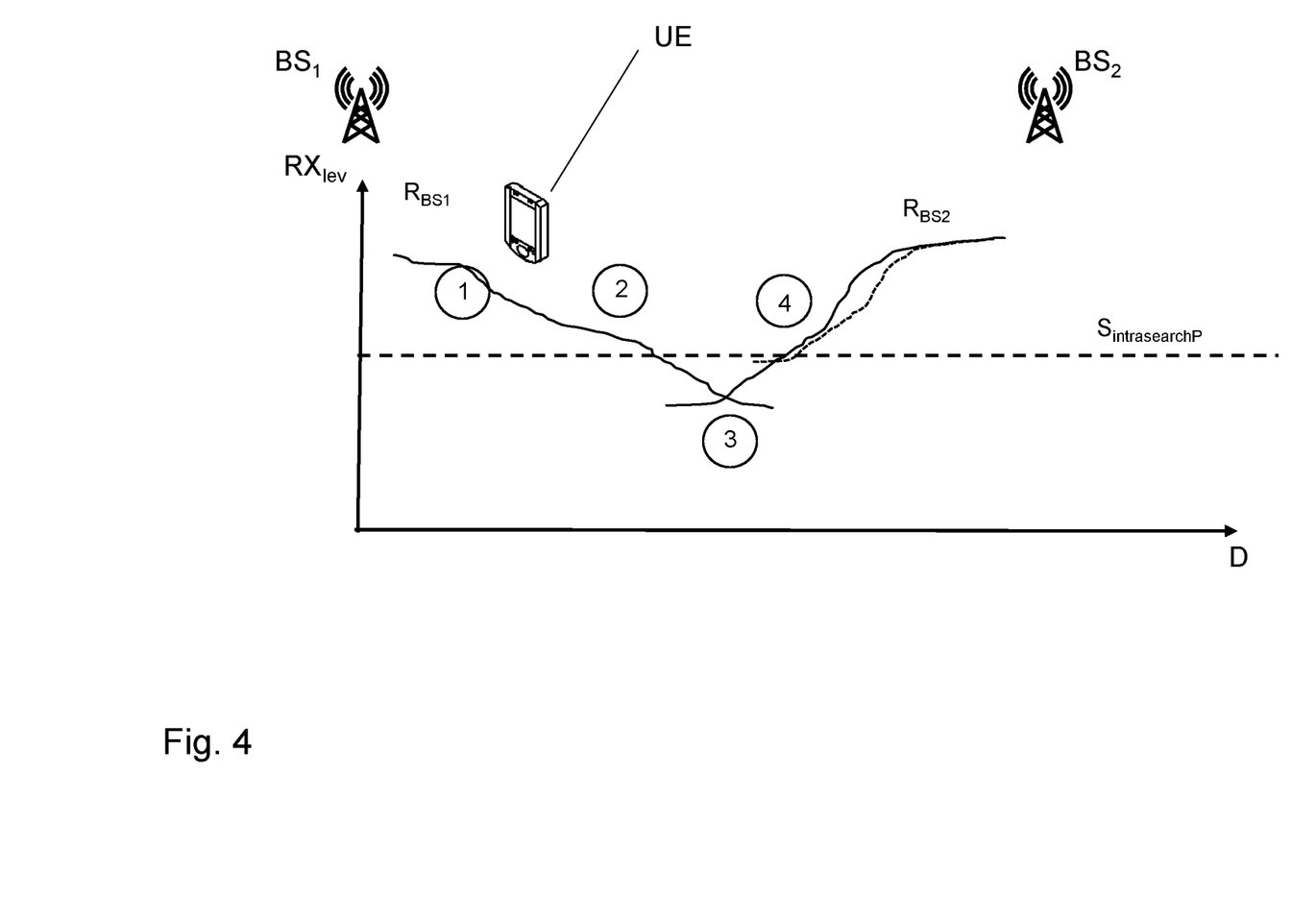
FIG. 4 shows a second exemplifying diagram of reception level change for a user equipment moving between two base stations.

FIG. 4 shows a second exemplifying embodiment showing a situation where a switch to the second base station $BS_2$ is carried out due to the usage of a specific feature, here the coverage enhancement.

1) The UE is aware that the neighbor base station $BS_2$ supports BL-operation and normal mode operation due to information from the SIBs, preferably from the serving base station $BS_1$.

2) The reception level of the serving base station (standalone cell) drops below normal decoding barrier (suitability level $S_{intrasearchP}$)

3) The BL-operation part of the neighbor base station $BS_2$ becomes larger than the level of the serving base station $BS_1$, and is reselected immediately, but only in CE mode (following the rule of selecting the strongest cell). Then the UE decodes all SIBs from $BS_2$, and continues to operate in BL mode, due to the fact that operation in CE mode is necessary.

4) BL-operation reaches non-CE method working mode, due to the fact that also non-CE operation is possible. This means that the UE needs to switch to non-BL mode. It decodes SIB1 of $BS_2$ and sends an update as now doing full-operation. Also here the behavior would be based on indication that UEs also supporting normal operation shall only camp on BL-part if and as long CE methods are needed.

As a consequence a reselection was done twice, at 3 to acquire BL part but when not needing CE re-select at 4, to normal part as the other part was indicated as barred. As said corresponding acquisition of the barring indication in SIB1-BR takes some time followed by acquisition of the SIBs for camping in normal mode.

In the above detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The above detailed description is, therefore, not to be taken in a limiting sense, and the scope of the present invention is defined only by the appended claims, appropriately interpreted, along with the full range of equivalents to which the claims are entitled.

The invention claimed is:

1. A method to operate a base station (BS) of a cellular network (CN), the base station being capable of supporting bandwidth-limited operation of a plurality of user equipments (UE) camping on said base station (BS), the method comprising:

broadcasting, by the base station (BS), a set of system information items, wherein the set of system information items comprises:
a first system information item (SI1) indicating that camping is allowed for a first user equipment capable of operating only in a bandwidth-limited operation mode, and
a second system information item (SI2) indicating that a new camping is allowed for a second user equipment capable of operating in modes other than the bandwidth-limited operation mode only if the second user equipment intends to use a specific feature supported by the base station (BS), the specific feature relating to the bandwidth-limited operation mode.

2. The method according to claim 1,
wherein the specific feature relating to the bandwidth-limited operation mode comprises at least one of:
an enhanced coverage mode,
an enhanced discontinuous reception mode,
a power saving mode,
a periodic data transmission, and
an early data transmission or reception.

3. The method according to claim 1,
wherein the set of system information items further comprises at least one system information item indicating if a neighbor base station (BS2) is supporting the bandwidth-limited operation mode.

4. The method according to claim 1,
wherein the second system information item (SI2) comprising a third system information item indicating whether user equipments (UE) that already camp on said base station (BS) and support modes of operation other than the bandwidth-limited operation mode are allowed to stay on said base station (BS).

5. The method according to claim 1,
wherein the second system information item (SI2) further indicates that at least one user equipment (UE) supporting at least one mode other than the bandwidth-limited operation mode is alternatively allowed to camp on said base station (BS) under a condition that it has no opportunity to camp on another base station in normal mode conditions.

6. The method according to claim 1,
wherein the set of system information item further comprises a fourth system information item indicating for which group or category of user equipments at least one of the first system information item (SI1) or the second system information item (SI2) is valid.

7. The method according to claim 1,
further comprising, by the base station (BS), placing at least two user equipments (UEs) supporting modes of operation other than the bandwidth-limited operation mode and allowed to camp on said base (BS) station in the same paging group or a respective wakeup-signal group.

8. A base station (BS) of a cellular network (CN), the base station being capable of supporting bandwidth-limited operation of a plurality of user equipments (UE) camping on said base station, wherein the base station (BS) is configured to:
broadcast a set of system information items, the set of system information items comprising:
a first system information item (SI1) indicating that camping is allowed only for a first user equipment (UE) capable of operating only in a bandwidth-limited operation mode, and
a second system information item (SI2) indicating that a new camping is allowed for a second user equipment capable of operating in modes other than the bandwidth-limited operation mode only if the second user equipment intends to use a specific feature supported by the base station, the specific feature relating to the bandwidth-limited operation mode.

9. The base station (BS) according to claim 8,
wherein the specific feature relating to the bandwidth-limited operation mode comprises at least one of:
an enhanced coverage mode,
an enhanced discontinuous reception mode,
a power saving mode,
a periodic data transmission (D-PUR),
an early data transmission or reception (EDT).

10. The base station (BS) according to claim 8,
wherein the set of system information items further comprises at least one system information item indicating if a neighbor base station (BS2) is supporting the bandwidth-limited operation mode.

11. The base station (BS) according to claim 8,
wherein the second system information item (SI2) is further accompanied by a third system information item indicating whether user equipments that already camp on said base station (BS) and support modes of operation other than the bandwidth-limited operation mode are allowed to stay on said base station.

12. The base station (BS) according to claim 8,
wherein the set of system information item further comprises a fourth system information item indicating for which group or category of user equipments the second system information item (SI2) is valid.

* * * * *